Patented Mar. 28, 1939

2,151,857

UNITED STATES PATENT OFFICE 2,151,857

WATER INSOLUBLE AZO DYESTUFF

Gottfried Manz, Cologne-Mulheim, and Werner Zerweck and Wilhelm Kunze, Frankfort-on-the-Main-Fechenheim, Germany, assignors to General Aniline Works, Inc., New York, N. Y., a corporation of Delaware No Drawing. Application March 26, 1936, Serial No. 71,046. In Germany April 4, 1935

2 Claims. (Cl. 260—205)

The present invention relates to new waterinsoluble azodyestuffs and to cellulose acetate fibers dyed therewith, more particularly it relates to azodyestuffs which may be represented by the general formula: $R'-SO_2-R-N=N-R''$. In the said formula R stands for a radical of the benzene series, for instance a benzene nucleus, which may bear substituents, which do not cause solubility in water or aqueous alkalies, such as halogen, the nitro group, an acylamino group, an acyl group, an alkyl sulfonyl group, an aryl sulfonyl group, alkyl or alkoxy, R' stands for an aliphatic, aromatic or hydroaromatic radical, such as methyl, ethyl, phenyl, cyclohexyl, which radicals may bear substituents of the kind referred to above, and R'' stands for the radical of an aromatic amine, which has been coupled in para position to the amino group, in which amine the hydrogen atoms of the amino group may wholly or partially be substituted, for example by aryl, alkyl, hydroxyalkyl in which the hydroxy group may be etherified, for example by alkyl, or esterified, such amines in which the nitrogen atom forms part of a heterocyclic ring system being enclosed. As coupling components coming into consideration for the manufacture of our new dyestuffs there may be mentioned by way of examples amines of the general formula

wherein Ar represents an aromatic radical of the benzene or naphthalene series, which radical may be substituted, for instance, by members selected from the group consisting of hydroxyl, alkoxy and alkyl, and wherein $x$ and $y$ stand for the same or different members selected from the group consisting of hydrogen, aryl, alkyl, a hydroxyalkyl and alkoxyalkyl, or $x$ and $y$ may be members of a non-aromatic heterocyclic ring.

Our new dyestuffs are obtainable by coupling the diazo compounds of amines of the general formula: $R'-SO_2-R-NH_2$, wherein R and R' mean the same as stated above, with aromatic amines or the substitution products into the position para to the amino group or substitution amino group.

From aqueous dye baths, the dyestuffs obtained, especially in the presence of emulsifying media, show, for a great part, a surprisingly good affinity for acetate artificial silk, and they dye the same in beautiful, clear and strong yellow, orange, red, violet and blue shades. They have, in general, good solubility in aqueous baths, in the presence of emulsifying media, yielding dyeings of good fastness to water and good dischargeability. They have good fastness to light. The dyestuffs which contain a free amino group in the molecule can be diazotized and developed on the fiber. They give strong red, violet and blue to bluish green dyeings of good properties.

The following examples illustrate the invention, without limiting it thereto:

Example 1.—17.1 grams of 2-aminophenyl methyl sulfone are dissolved, with the aid of 28 ccs. of hydrochloric acid of 19.5° Bé. in 300 ccs. of hot water. After cooling with ice to 5° C., diazotization is effected by the addition of an aqueous solution of nitrite containing 6.9 grams of NaNO₂, and the diazo solution is added to an ice cooled solution of 18.7 grams of N-hydroxy-ethyl-α-naphthylamine with 11 ccs. of hydrochloric acid of 19.5° Bé. in 300 ccs. of water. After the coupling is complete, the hydrochloric acid is neutralized by the addition of a solution of sodium acetate to the reaction mass, the dyestuff is filtered with suction and washed with water until neutral. The dyestuff having in its free state the following formula:

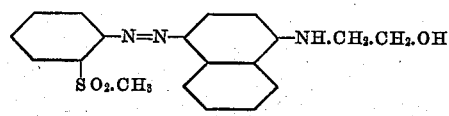

is used for dyeing as a paste and gives, on acetate artificial silk, from the soap bath, a strong and clear scarlet shade of good properties.

Example 2.—17.1 grams of 2-aminophenyl methyl sulfone are diazotized, as indicated in Example 1, and the diazotization mixture, at +5° C., is added to a solution of 14.3 grams of naphthylamine with 11 ccs. of hydrochloric acid of 19.5° Bé. in 300 ccs. of water. After coupling is complete, the hydrochloric acid is neutralized with a solution of sodium acetate, and the dyestuff having in its free state the following formula:

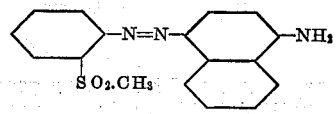

is isolated as a paste, as indicated in Example 1. On acetate artificial silk the dyestuff gives a full orange, which shade turns to a violet or a reddish blue by diazotization and developing on the fiber with β-naphthol or 2,3-hydroxynaphthoic acid, respectively.

*Example 3.*—17.1 grams of 3-aminophenyl methyl sulfone are diazotized, according to Example 1, and coupled, in a medium acid, to Congo red with 18.7 grams of N-hydroxyethyl-α-naphthylamine. The dyestuff having in its free state the following formula:

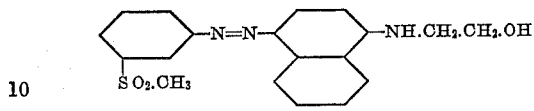

yields, on acetate artificial silk, from the soap bath, clear and yellowish red shades of good properties.

*Example 4.*—17.1 grams of 3-aminophenyl-methyl sulfone are coupled according to Example 1 in a medium acid to Congo red with 14.3 grams of α-naphthylamine. On acetate artificial silk the dyestuff having the following formula:

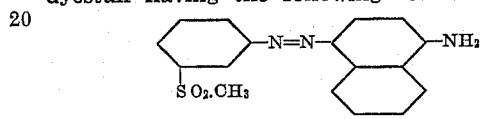

gives a reddish orange, which shade, by developing on the fiber with β-naphthol, is turned to a reddish violet.

*Example 5.*—A diazo solution of 17.1 grams of 4-aminophenyl methyl sulfone prepared according to Example 1 is combined, in a medium acid to Congo red with a solution of 23.5 grams of the hydrochloride of 3'-hydroxy-1',2',3',4'-tetrahydro-1,2-naphthoquinoline of the formula:

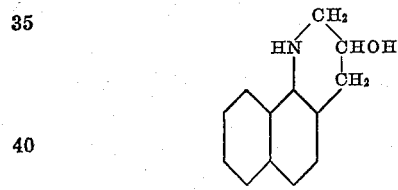

The dyestuff is isolated by neutralizing with a solution of sodium acetate and used for dyeing as a paste. It corresponds to the following formula:

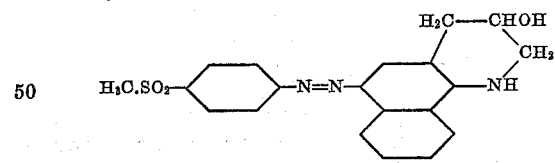

and dyes acetate artificial silk excellently with a strong clear and bluish red shade.

*Example 6.*—17.1 grams of 4-aminophenyl methyl sulfone are diazotized, according to Example 1, and coupled in a hydrochloric acid medium with 14.3 grams of α-naphthylamine. The dyestuff having the following formula:

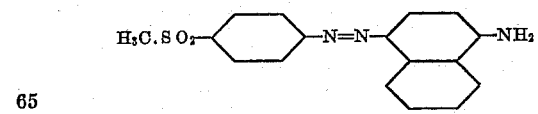

is isolated as a paste and has a very good affinity for acetate artificial silk, dyeing the same scarlet red shades, which pass to a violetish black by diazotization and developing with 2,3-hydroxynaphthoic acid.

*Example 7.*—22.1 grams of the hydrochloride of 3-aminophenyl ethyl sulfone are diazotized in an aqueous solution, as in Example 1, and coupled in a medium acid to Congo red with 18.7 grams of α-hydroxyethylnaphthylamine. The dyestuff having the following formula:

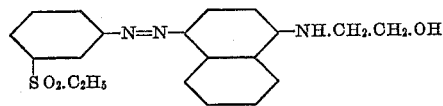

dyes acetate artificial silk clear and orange shades of somewhat yellower tones than the dyestuff of Example 3.

*Example 8.*—20.5 grams of 4-chloro-2-aminophenyl methyl sulfone are suspended in 140 ccs. of glacial acetic acid and 7 ccs. of sulfuric acid of 66° Bé. are added. Then, with moderate cooling, the calculated quantity of nitrosyl sulfuric acid is added, so that complete solution is effected. The diazotization mixture is poured into ice water and then a hydrochloric acid solution of 23.7 grams of 1-methyl-4-methoxy-5-hydroxyethyl-n-butyl-aminobenzene of the formula:

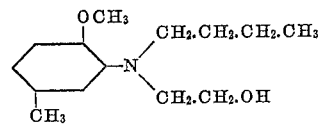

is added, and coupling is completed by gradually adding a solution of sodium acetate. The dyestuff having the following formula:

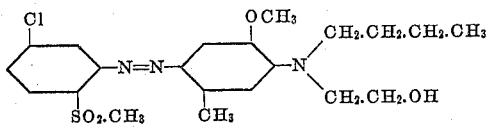

dyes acetate artificial silk salmon red shades.

*Example 9.*—To a suspension of 21.6 grams of 5-nitro-2-aminophenyl methyl sulfone in 140 ccs. of glacial acetic acid with moderate cooling, 7 ccs. of sulfuric acid of 66° Bé. and the calculated quantity of nitrosyl sulfuric acid are added. The diazotization mixture is poured into ice water and coupled, in a medium acid to Congo red with 16.3 grams of diethyl-m-toluidine. After being isolated, the dyestuff having the following formula:

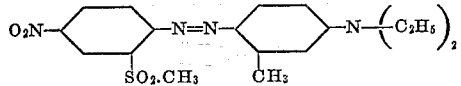

is neutralized with sodium carbonate. The dyeing on acetate artificial silk is a reddish violet of good properties.

*Example 10.*—21.6 grams of 3-nitro-4-aminophenyl methyl sulfone are diazotized, as indicated in Example 9, and coupled, in a medium acid to Congo red with 23.7 grams of 1-methyl-4-methoxy-5-hydroxyethyl-n-butyl aminobenzene. The dyestuff having the following formula:

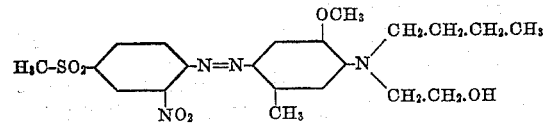

dyes acetate artificial silk yellowish red shades.

*Example 11.*—31.1 grams of 4-methylsulfonyl-3-aminodiphenyl sulfone are dissolved, at room temperature, in 70 ccs. of sulfuric acid of 66° Bé., and diazotized with the calculated quantity of nitrosyl sulfuric acid. The diazotization mixture is poured on ice and, in a medium acid to Congo red coupled with 15.1 grams of hydroxy-ethyl methyl aniline. After isolation, the dyestuff having the following formula:

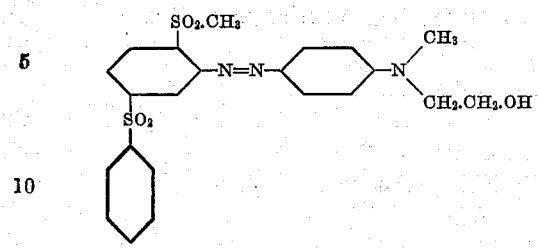

is neutralized with sodium carbonate. On acetate artificial silk it dyes a yellowish orange of good properties.

The process can also be effected by adding to the sulfuric acid diazotization mixture, after diluting with ice water, the calculated quantity of a solution of zinc chloride, whereby the zinc chloride double compound of the diazo salt separates as a yellowish powder. This salt is isolated and used for further coupling.

*Example 12.*—26.8 grams of 4-chloro-3-aminodiphenyl sulfone are diazotized, as indicated in Example 11, and then coupled, in a medium acid to Congo red with 19.5 grams of dihydroxyethyl-m-toluidine. The dyestuff having the following formula:

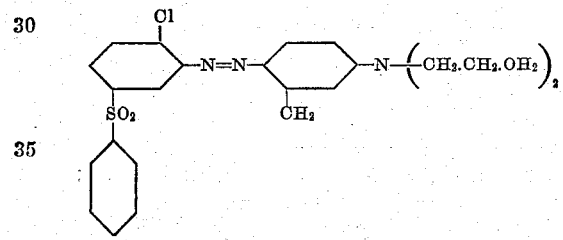

worked up according to Example 11, dyes acetate artificial silk orange shades.

*Example 13.*—201 parts of 4-aminophenyl hydroxyethylsulfone are diazotized in a hydrochloric acid solution with 70 parts of sodium nitrite. The clear diazo solution obtained is coupled with a hydrochloric acid solution of 125 parts of dimethylaniline. The coupling, which begins in the hydrochloric acid solution, is completed by the addition of sodium acetate, then the dyestuff formed is isolated by filtration with suction, washing and drying. The dyestuff having the following formula:

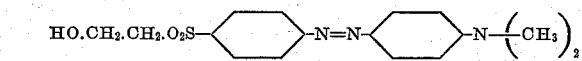

is mixed with a dispersing agent. It yields when dyed on acetate silk a light orange of great strongness and good fastness properties.

When coupling with hydroxyethylmethylaniline a dyestuff of a similar shade and similar fastness properties is obtained.

*Example 14.*—201 parts of 4-aminophenylhydroxyethylsulfone are diazotized in the usual manner and the diazo solution obtained is added to a solution of 185 parts of diphenylamine in acetone, the coupling being completed by neutralizing the mineral acid by the addition of sodium acetate. The dyestuff which is isolated by distilling off the acetone and filtering with suction dyes acetate silk, after mixing with a suitable dispersing agent, powerful yellowish orange shades of good fastness properties. The dyestuff corresponds to the following formula:

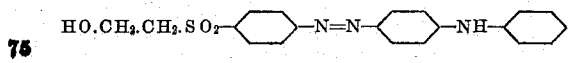

*Example 15.*—236 parts of 3-chloro-4-aminophenyl-1-hydroxyethylsulfone are dissolved in acetone with the aid of the calculated quantity of hydrochloric acid, the solution is diluted with ice water and diazotization is effected in the usual manner with sodium nitrite. The diazo solution is filtered and stirred into a hydrochloric acid solution prepared from 150 parts of diethylaniline. Coupling begins in the mineral acid solution and is completed by neutralizing the mineral acid by the addition of sodium acetate. The dyestuff having the following formula:

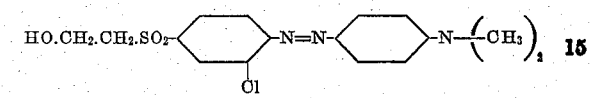

is filtered with suction; after pasting with a dispersing agent it yields on cellulose acetate silk powerful clear reddish orange shades of good fastness to water, light and of a very good dischargeability.

When using as coupling components hydroxyethylmethylaniline or dihydroxyethyl-m-toluidine, there are obtained dyestuffs of similar shades and properties.

When substituting the diazotization component by 3-chloro-4-aminophenylethylsulfone or 3-chloro-4-aminophenylmethylsulfone or 3-bromo-4-aminophenylmethylsulfone, there are obtained dyestuffs yielding on acetate silk vivid strong reddish orange shades.

Yellowish orange shades of similar fastness properties are obtained when the above-named coupling components are coupled with diazotized 3-methoxy-4-aminophenylhydroxyethylsulfone or diazotized 3-methyl-4-aminophenylhydroxyethylsulfone.

*Example 16.*—241 parts of 2,5-dichloro-4-aminophenyl-methylsulfone are introduced at 10–20° C. into 400 parts of nitrosylsulfuric acid containing the calculated quantity of nitrous acid. When the sulfone has entered the solution, the diazotization mixture is poured onto ice. A clear diazo solution obtained is then poured into an ice cold solution of 155 parts of hydroxyethylmethylaniline in the calculated quantity of hydrochloric acid. The formation of the dyestuff begins at once and is completed by neutralizing the mineral acid. After filtering with suction and drying there is obtained a scarlet red powder, which after pasting with one of the usual dispersing agents yields on acetate silk powerful vivid scarlet shades of good fastness properties. The dyestuff corresponds to the following formula:

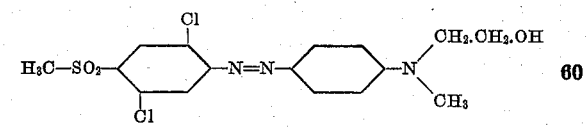

By combining the diazotization components mentioned in paragraph 1 with dihydroxyethyl-m-toluidine there is obtained a dyestuff yielding on acetate silk more bluish scarlet shades. When combining diazotized 4-amino-2,3-dichlorophenylmethylsulfone with hydroxyethylmethylaniline, there is obtained a dyestuff of similar shades, having a strong affinity to acetate silk, while the latter-mentioned coupling component yields with diazotized 3,5-dichloro-4-aminophenylmethylsulfone an orange dyestuff.

The following table indicates further combinations manufactured according to the present process and the shades obtained with them on acetate artificial silk:

alkyl and lower hydroxy alkyl radicals, which dyestuffs yield on cellulose acetate silk reddish shades of particularly good fastness properties.

| Diazotization components | Coupling components | Shade |
|---|---|---|
| 2-aminophenyl methyl sulfone | 3'-hydroxy-1',2',3',4'-tetrahydro-1,2-naphthoquinoline. | Pink. |
| Do | β-Hydroxyethylnaphthylamine | Do. |
| Do | Diethyl-m-toluidine | Orange. |
| Do | 1-amino-5-naphthol | Reddish violet. |
| Do | 1-amino-2-naphthol-ethylether | Bluish red. |
| | Dyeing, when developed with β-naphthol | Blue. |
| Do | 1-methyl-4-methoxy-5-aminobenzene | Orange. |
| | Dyeing, when developed with β-naphthol | Bluish red. |
| 3-aminophenyl methyl sulfone | β-Hydroxyethyl-naphthylamine | Orange. |
| Do | 1-amino-5-naphthol | Blackish violet. |
| Do | 1-amino-2-naphtholether | Scarlet. |
| Do | 1-methyl-4-methoxy-5-aminobenzene | Reddish orange. |
| | Dyeing, when developed with β-naphthol | Bluish red. |
| 4-aminophenyl methyl sulfone | α-Hydroxyethyl naphthylamine | Scarlet. |
| Do | β-Hydroxyethyl naphthylamine | Red. |
| Do | 1-amino-5-naphthol | Ruby. |
| Do | Diethyl-m-toluidine | Orange. |
| Do | 1-methyl-4-methoxy-5-hydroxyethyl-n-butyl aminobenzene. | Reddish orange. |
| Do | 1-amino-2-naphtholether | Red. |
| Do | 1-methyl-4-methoxy-5-aminobenzene | Orange. |
| | Dyeing, when developed with β-naphthol | Bluish red. |
| 3-aminophenylethyl sulfone | 3'-hydroxy-1', 2', 3', 4'-tetrahydro-1, 2-naphthoquinoline. | Do. |
| 4-chloro-2-aminophenyl-methylsulfone | α-Hydroxyethyl-naphthylamine | Pink. |
| Do | β-Hydroxyethyl-naphthylamine | Do. |
| Do | 1-methyl-4-methoxy-5-aminobenzene | Orange. |
| | Dyeing, when developed with β-naphthol | Violet. |
| 5-nitro-2-aminophenyl-methylsulfone | 1-methyl-4-methoxy-5-hydroxyethyl-n-butyl-aminobenzene. | Do. |
| Do | α-Hydroxyethyl naphthylamine | Do. |
| Do | 3'-hydroxy-1', 2', 3', 4'-tetrahydro-1, 2-naphthoquinoline. | Reddish blue. |
| 3-nitro-4-aminophenyl-methylsulfone | α-Hydroxyethyl-naphthylamine | Corinth. |
| Do | 3'-hydroxy-1', 2', 3', 4'-tetrahydro-1, 2-naphthoquinoline. | Violet. |
| Do | 1-methyl-4-methoxy-5-aminobenzene | Scarlet. |
| | Dyeing, when developed with β-naphthol | Violet. |
| 4-methoxy-3-aminodiphenylsulfone | Hydroxyethylmethylaniline | Orange. |
| 3-nitro-4-aminodiphenylsulfone | Dihydroxyethyl-m-toluidine | Bluish red. |

We claim:
1. Water-insoluble azodyestuffs of the formula:

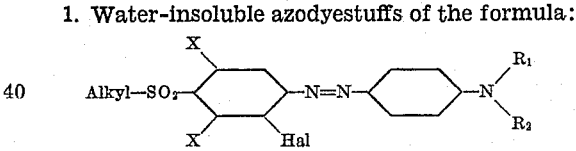

wherein either X stands for a member of the group consisting of hydrogen and halogen, at least one X being hydrogen, and $R_1$ and $R_2$ stand for a member of the group consisting of lower 2. The azodyestuff of the following formula:

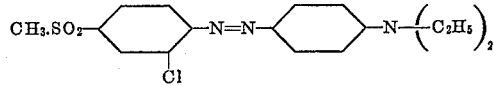

yielding on acetate silk strong reddish orange shades of good fastness properties.

GOTTFRIED MANZ.
WERNER ZERWECK.
WILHELM KUNZE.